Figure 1:
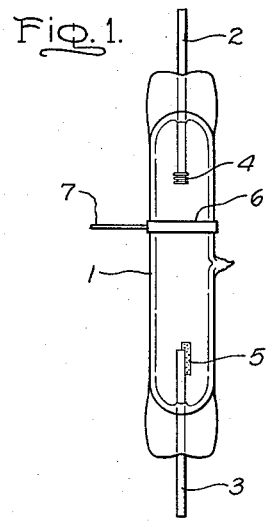

Oct. 25, 1960  P. B. DAVIS ET AL  2,957,231
ELECTRODE FOR ELECTRIC DISCHARGE DEVICE
Filed Aug. 1, 1958

Inventors:
Paul B. Davis,
Clifford F. O'Neill,
Stanley L. Slomski,
Dimitrios M. Speros,
by Andrew J. Bootz
Their Attorney.

2,957,231

ELECTRODE FOR ELECTRIC DISCHARGE DEVICE

Paul B. Davis, Mayfield Heights, Clifford F. O'Neill, Euclid, Stanley L. Slomski, Chardon, and Dimitrios M. Speros, Willoughby, Ohio, assignors to General Electric Company, a corporation of New York Filed Aug. 1, 1958, Ser. No. 752,496

4 Claims. (Cl. 29—182.5)

This invention relates to electric discharge devices and more particularly to electrodes therefor.

Certain types of gaseous electric discharge lamps, such as the flashtubes used for flash photography, have an electrode sealed into each end of the tube. One such electrode is an anode, the other is a cathode of the cold type, that is one which receives no heating except as a result of the discharge when it occurs.

Cathodes have been produced consisting of a sintered refractory metal or metals such as tungsten pellet impregnated with an alkaline earth emissive material such as molten barium compounds. As compared to other types of cathodes, sintered pellets possess high mechanical strength and afford ease of manufacture and assembly in a lamp, as well as permitting definite dimensions for the emissive material. Such prior known pellets impregnated with an alkaline earth emissive material, however, depend upon a reaction between the emissive compound and the tungsten to produce the free barium necessary as a constituent for an efficient emissive material. For example, when such a pellet is impregnated with barium peroxide ($BaO_2$), the barium peroxide decomposes upon heating to form a lower oxide, barium oxide ($BaO$), and liberated oxygen. A part of the free oxygen then combines the tungsten to form tungsten oxides which, in turn, form a barrier between the barium oxide and the tungsten. The barium oxide then combines with the tungsten oxides to form tungstates. These compounds, when rich enough in BaO, react with the free tungsten to form more interface and free barium. The barium then must diffuse through this new and subsequently the old interface to reach the surface which can then emit electrons.

Such an alkaline earth cathode depends on several solid state processes for its operation, it is extremely sensitive to variations in manufacture; hence variations in quality between various cathodes will occur from one batch to another. Further, since this reaction depends on tungsten for the reduction reaction to form free barium, the breakdown (or starting) voltage of the flashtube is high. Further, if the tungsten pellet is of appreciable density, the diffusion of the emissive materials to the surface of the pellet appear to be unduly hindered. Particularly in applications where the rate of diffusion must be high (as in repetitive use flashtubes) there is not enough material existing on the surface and the uncovered tungsten is then exposed which causes blackening of the flashtube. This situation can be corrected only by heating the cathode periodically.

An object of the invention is to provide an improved pellet type cathode structure which will improve the maintenance and useful life of the flashtube.

A further object of the invention is to provide an improved pellet type cathode structure for a flashtube which will minimize blackening on the inside of the flashtube walls.

Briefly stated, the improved cathode structure for an electric discharge tube comprises an electron emissive material in a pellet of non-reactive, highly porous refractory metal such as tungsten, of coarse particles, so selected that substantially no interaction occurs between the refractory metal and the electron emissive material and the tungsten acts as a "sponge" to support the emissive material. The tungsten and emissive material may be considered as inert or non-reactive with respect to each other. A suitable emissive material comprises a mixture of a barium compound and a reducing agent such as aluminum.

It has been found, according to the instant invention, that a sintered cathode pellet containing an activated emissive material composed of barium aluminate, aluminum oxide and barium and more fully described and claimed in co-pending application Serial No. 655,534, filed April 29, 1957, by D. M. Speros, and assigned to the assignee of the instant invention, now U.S. Patent 2,871,196, does not depend on reaction between the tungsten and emissive material for the reduction reaction of free barium, but the free barium is formed quickly through the reaction between the emissive material and the aluminum. Consequently, there is produced a flashtube having a breakdown (or starting) voltage appreciably lower than that of flashtubes using prior known cathodes. Further, a binder is not necessary in such a pellet. Due to the high porosity and the quantity of surface, the emissive material is amply replenished in normal operation. Such a tungsten pellet functions as a large number of hollow cathodes; the cathode pellet according to the instant invention has holes containing activated material, whereas the prior cathode pellets are believed to have consisted of fine tungsten particles probably coated with activated emissive material. The main effect of the tungsten, as stated above, is to act as a conducting matrix body or "sponge" to hold the non-conducting emissive material such as barium aluminate.

Figure 3:
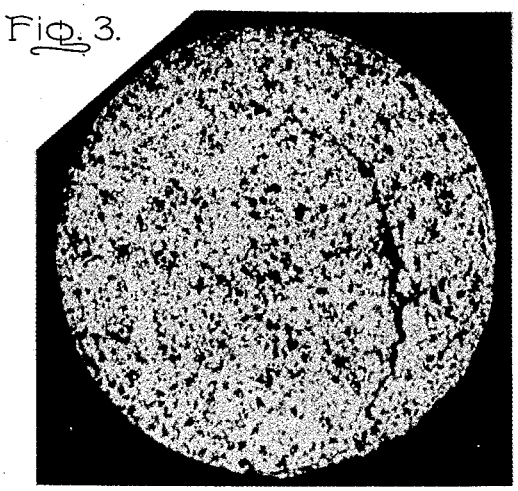
Figure 2:
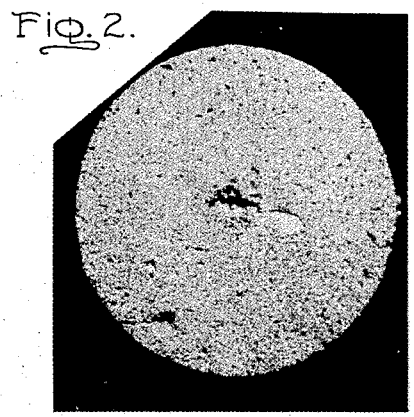
Figure 4:
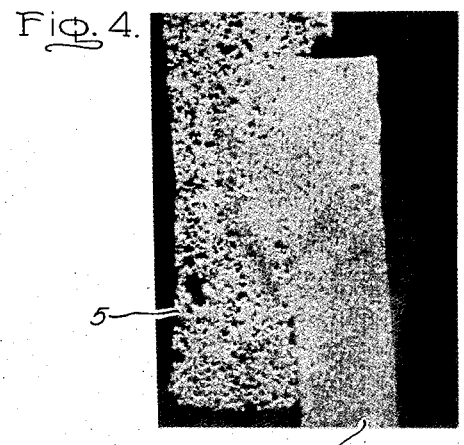
Figure 5:
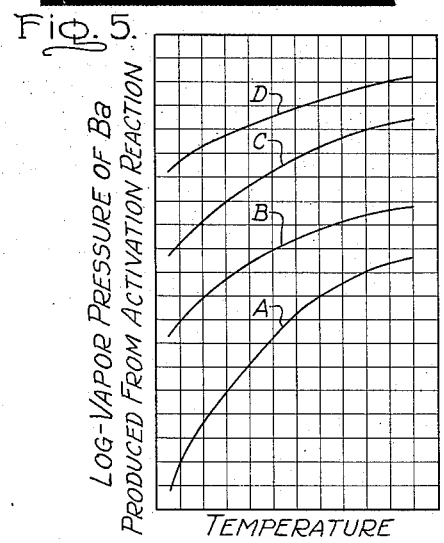

Other objects, advantages and features will be apparent from the specification below taken in conjunction with the accompanying drawings, in which:

Fig. 1 is a side view of a flashtube having a cathode according to the present invention, Fig. 2 is a microphotograph of a prior known sintered pellet, Fig. 3 is a microphotograph of a sintered pellet according to the instant invention, Fig. 4 is a microphotograph of a cross-section of a sintered cathode pellet according to the instant invention, and Fig. 5 is a curve illustrating the favorable thermodynamic reaction of barium oxide reduced by a reducing agent such as aluminum as compared to the reduction of barium oxide into free barium by tungsten.

Referring to Fig. 1, the lamp or tube comprises the tubular glass envelope 1 the ends of which are closed and hermetically sealed and have extending therethrough lead-in wires 2, 3 which have their inner ends forming, or secured to, an anode 4 and a cathode 5 according to the instant invention. As illustrated, the inner end of the lead-in wire is provided with a wire coil of suitable refractory metal which functions as the anode; however, the inner end of the lead-in wire 2 may function directly as the anode. The tube is filled with a suitable ionizable gas such as xenon. Means are generally provided for initiating a discharge through the tube, and, as herein illustrated, comprise a transparent conducting coating on the discharge portion of the tube, secured to a source of high frequency high voltage current (not shown) through a metal band 6 and conductor 7.

The emissive material in the cathode pellet 5 may be that more fully described and claimed in the above mentioned co-pending application of Speros, and corresponds to the formula $(xBaO \cdot Al_2O_3) \cdot yBa$ wherein $x$ is between 0.1 and 1 and $y$ is between $0.5x$ and $2.6x$, and preferably corresponds essentially to the formula $$0.33BaO \cdot Al_2O_3 \cdot yBa$$

wherein $y$ is between 0.5 and 0.89.

The emissive material is mixed with coarse tungsten powder having a particle size of 3 to 8 microns, and is pressed into pellets. One part by weight of the emissive material is mixed with about 8.5 to 9.5 parts by weight of tungsten powder. In order to provide a low density, highly porous pellet, the above mixture may be pressed at a load of 100,000 to 400,000 lbs. per sq. inch. A satisfactory pellet made in this manner should have a density less than 10 and preferably greater than 8.5. A satisfactory density appears to be about 9.25. After pressing, the pellet is sintered in the temperature range of 1100 to 1300° C. for a period in the range of 1 to 3 hrs.

As a specific example, a cathode pellet according to the instant invention may be composed by mixing, as the starting material, barium aluminate of the formula $BaO \cdot Al_2O_3$ with powdered aluminum in proportion by weight of the total compound of 4.06% aluminum to form the emissive material. At this condition there is 0.4 mole of aluminum powder for each mole of barium aluminate. One part of this emissive material is mixed with 9 parts by weight of tungsten powder having a particle size of between 3 to 8 microns. This mixture is then represented in terms of moles as follows: $BaAl_2O_4 + 0.4Al + 13.2W$. The mixture is pressed into pellets approximately 1 mm. in thickness with a hydraulic press exerting a load of 5,000 lbs. with ¼ inch dies (100,000 lbs. per sq. inch). The pellet is then fired in a dry hydrogen furnace at 1130° C. for 2 hrs. After firing, the pellets theoretically consist of $1.2[0.33BaO \cdot 1Al_2O_3 \cdot 0.5Ba] + 13.2W$, although undoubtedly some of the barium has evaporated and a small amount of tungstate may have been formed.

As above mentioned, the tungsten "sponge" acts merely as a support for the emissive material and therefore should consist of a large number of hollow cavities to hold the emissive material. Such a sponge must, of necessity, be very porous and of low density. This is illustrated in Figs. 2 to 4. Fig. 2 is a microphotograph of a prior commercial sintered tungsten cathode having a density of 15 gm. per cc. Fig. 3 is a cathode made according to the instant invention, as specified in the specific example above, and having a density of 925 gm. per cc. Figs. 2 and 3 are at the same magnification. It can be readily seen that Fig. 3 contains a large number of voids or cavities which contain emissive material. Fig. 4 is a microphotograph of a cross-section of a pellet 5 according to the instant invention, welded to a lead-in wire 3. Since the electrical resistance of the pellet after firing is very low, the pellet may be secured to the lead-in wire by direct spot welding, as is illustrated in Fig. 4.

The table below gives a comparison of the densities of the present pellet with prior pellets. It is readily seen that the instant pellet possesses a lower density and consequently higher porosity.

| Composition: | Density (gms./cc.) |
| --- | --- |
| Prior commercial sintered tungsten cathode | 15.0 |
| Lemmers disclosure (U.S. Patent 2,121,637) | 10.0 to 16.0 |
| Lemmers disclosure "preferable" density | 13.0 |
| Present sintered tungsten cathode | 9.25 |

Fig. 5 shows the theoretical vapor pressure of barium produced from activation reactions as a function of activation temperature and illustrates the favorable thermodynamic reaction of barium oxide reduced by a reducing agent such as aluminum, as compared to the prior tungsten reduction of barium oxide into free barium by tungsten as explained above. Curve A represents a prior emissive material comprising $BaO \cdot Al_2O_3$ reduced by tungsten into free barium; curve B illustrates prior known barium oxide reduced to free barium by tungsten; curve C represents a reaction wherein barium aluminate emissive material (made in accordance with the specific example above) is reduced to free barium by aluminum; and curve D represents the tendency of the reaction between barium oxide and aluminum to reduce the barium oxide to free barium. It can be seen that the tendency of aluminum to reduce barium compounds to free barium is so much greater than the tendency of tungsten to reduce barium compounds that the latter reaction can be ignored in the instant invention and the tungsten acts as a "sponge" to support the emissive mix. In the presence of a reducing agent such as aluminum, there is a negligible reaction between the barium compound and the tungsten, at least until the higher temperatures are reached; thereby the solid state process described above as occurring in prior known sintered tungsten cathodes becomes negligible. Such an interoxide cathode involves no interfaces of tungstates, while the prior alkaline earth compound impregnated in a sintered tungsten pellet inevitably does so.

The cathode pellet according to the instant invention is one that may be exposed to air, water vapor, and carbon dioxide both before and after activation and permits a preformed and preactivated cathode to solve the problems of variations in manufacturing. Such a cathode pellet is fully activated prior to or during assembly with the lamp, and does not depend on activation proceeding continuously during life. The tungsten porous body also retards the diffusion and evaporation of barium from the cathode, thus permitting its operation at higher temperatures such as those encountered in repetitive flashtubes. Further, since the emissive materials are held inside the tungsten sponge, higher voltages may be used for the operation of the flashtube without fear of loss of adhesion between the emissive material and the substrate. Since blackening of the flashtube with life is virtually eliminated with the cathode according to the present invention, the maintenance of light output of the tube with life is greatly improved. Also, in the preferred composition, the present cathode involves only reactions in the solid state; no gases are evolved during any phase of manufacture permitting the reduction of pumping loads and eliminating elaborate heating and degassing steps. This, of course, is not true in cases where the sintered tungsten pellet contains carbonates, oxalates, peroxides and the like.

What is claimed as new and desired to be secured by Letters Patent of the United States is:

1. A sintered cathode pellet for an electric discharge tube consisting essentially of a highly porous tungsten sponge having density in the range of 8.5 to 10 and formed of 8.5 to 9.5 parts by weight of coarse tungsten powder having a particle size in the range of about 3 to 8 microns and one part by weight of an emissive material corresponding essentially to the formula $(xBaO \cdot Al_2O_3) \cdot yBa$ wherein $x$ is between 0.1 and 1 and $y$ is between $0.5x$ and $2.6x$.

2. A sintered cathode pellet as defined in claim 1 and having a density of about 9.25.

3. A sintered cathode pellet for an electric discharge tube consisting essentially of a highly porous tungsten sponge having a density in the range of 8.5 to 10 and formed of about 9 parts by weight of tungsten powder having a particle size of about 3 to 8 microns and about one part by weight of an emissive material corresponding essentially to the formula $(0.33BaO \cdot Al_2O_3) \cdot yBa$ wherein $y$ is between 0.5 and 0.89.

4. A sintered cathode pellet as defined in claim 3 having a density of about 9.25.

References Cited in the file of this patent

UNITED STATES PATENTS

| 2,700,118 | Hughes | Jan. 18, 1955 |
| 2,769,708 | Coppola et al. | Nov. 6, 1956 |